US007725927B2

(12) United States Patent
Yang et al.

(10) Patent No.: US 7,725,927 B2
(45) Date of Patent: May 25, 2010

(54) LOW CODE-FOOTPRINT SECURITY SOLUTION

(75) Inventors: Lie Yang, Palo Alto, CA (US); Thomas Kraus, Hamburg (DE); Markus Meyer, Winsen Luhe (DE); Venkatachary Srinivasan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1244 days.

(21) Appl. No.: 11/262,194

(22) Filed: Oct. 28, 2005

(65) Prior Publication Data

US 2007/0101412 A1    May 3, 2007

(51) Int. Cl.
H04L 29/06    (2006.01)
(52) U.S. Cl. .......................................... 726/5; 713/155
(58) Field of Classification Search ..................... 726/5; 713/151, 160–161
See application file for complete search history.

(56) References Cited

U.S. PATENT DOCUMENTS

| 6,119,167 | A  | * | 9/2000  | Boyle et al. ................. 709/234 |
| 6,694,431 | B1 | * | 2/2004  | Binding et al. .............. 713/160 |
| 7,051,003 | B1 | * | 5/2006  | Kobata et al. ................. 705/51 |
| 2001/0042124 | A1 | | 11/2001 | Barron |
| 2002/0039420 | A1 | | 4/2002  | Shacham et al. |
| 2003/0065929 | A1 | * | 4/2003 | Milliken ...................... 713/189 |
| 2003/0131238 | A1 | * | 7/2003 | Vincent ...................... 713/176 |
| 2004/0059834 | A1 | * | 3/2004 | Taylor et al. ................. 709/247 |
| 2005/0063543 | A1 | | 3/2005  | Kayalackakom et al. |
| 2005/0256975 | A1 | * | 11/2005 | Kaniz et al. ................. 709/250 |

FOREIGN PATENT DOCUMENTS

| JP | 10-308758 A | 11/1998 |
| JP | 2000-209254 A | 7/2000 |
| JP | 2001-326695 A | 11/2001 |
| WO | WO-01/97442 A2 | 12/2001 |
| WO | WO-01/97442 A3 | 12/2001 |

OTHER PUBLICATIONS

J. Franks, P. Hallam-Baker, J. Hostetler, S. Lawrence, P. Leach, A. Luotonen, L. Stewart. HTTP Authentication: Basic and Digest Access Authentication. RFC 2617. Jun. 1999.*

Dierks, T. et al. (Jan. 1999). "The TLS Protocol, Version 1.0," located at <http://www.ietf.org/rfc/rfc2246.txt>, last visited on Dec. 15, 2005, 71 pages.

Krawczyk, H. et al. (Feb. 1997). "HMAC: Keyed-Hashing for Message Authentication," located at <http://www.ietf.org/rfc/rfc2104.txt>, last visited on Dec. 15, 2005, 10 pages.

(Continued)

*Primary Examiner*—Gilberto Barron, Jr.
*Assistant Examiner*—Virginia Ho
(74) *Attorney, Agent, or Firm*—Greenberg Traurig, LLP (57) ABSTRACT

Apparatus and method for conducting secured communications with a client device in a network are disclosed. The method includes receiving at the server a request message from the client device, wherein the request message comprises a nonce, a nonce count and an encrypted request, determining whether the client device has permission to access the server using the nonce and the nonce count, forming an encrypted server response message in response to the encrypted request and the client device has permission to access the server, and issuing the encrypted server response message from the server to the client device.

36 Claims, 6 Drawing Sheets

OTHER PUBLICATIONS

National Institute of Standards and Technology. (Nov. 26, 2001). "Advanced Encryption Standard (AES), Federal Information Processing Standards Publication 197," located at <http://csrc.nist.gov/publications/fips/fips197/fips-197.pdf>, last visited on Dec. 15, 2005, 51 pages.

Rivest, R. (Apr. 1992). "The MD5 Message-Digest Algorithm," located at <http://www.ietf.org/rfc/rfc1321.txt>, last visited on Dec. 15, 2005, 19 pages.

U.S. Appl. No. 11/182,348, filed on Jul. 14, 2005 for Breuer et al.

* cited by examiner

LOW CODE-FOOTPRINT SECURITY SOLUTION

FIELD OF THE INVENTION

The present invention relates to the field of network communications security. In particular, the present invention relates to a method and system for conducting secured communications between a server and a client device in a network.

BACKGROUND OF THE INVENTION

The recent proliferation of electronic devices for communication, information management and recreation has taken routine computing power far away from the desk-bound personal computer. Users are using devices such as cell phones, camera phones, personal digital assistants (PDAs) and navigation systems, not only in the office and in the home, but also in the field and on the road. There is a diverse range of possible applications for such devices, including communication, business, navigation, entertainment and even managing basic daily activities. Many users today only use a single device for a single task, for example, using cell phones for making and receiving phone calls. However, these devices are no longer single-function devices. They are capable of creating various types of data, for instance, electronic mail, voice messages, photos, video, etc. Increasing the number of functions of a device increases the desirability of personalization for each user. It is desirable to provide users a connected-service to connect and access their data wherever they are, with whatever device they are using and whatever service they are connected to.

One of the challenges of providing such a connected-service to a user is the need to securely transfer information between the content router server and one or more client devices in the communication network. Traditional means for ensuring security through the Secure Socket Layer (SSL) protocol is not practical for many mobile client devices with small memory footprint and low computing capabilities. For example, the client device needs to implement Rivest-Shamir-Adleman (RSA) encryption, which requires a large amount of memory for executing the RSA encryption software code. In addition, implementing the SSL protocol client authentication requires the client device to manage a large number of client certifications, which imposes significant implementation and performance burdens on the client device.

There are also issues for implementing the SSL protocol on the server. For example, with RSA encryption, the decryption algorithm at the server requires a large amount of computing power to execute. Also, each device has to share a session key, which imposes the burden on the server to keep track of the multiple communication requests from the same client device.

Therefore, there is a need to address the problems of the existing SSL protocol in conducting secured communicationss between a server and a client in a network.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

SUMMARY

In one embodiment, an apparatus for conducting secured communications with a client device in a network, wherein the apparatus includes logic operable on a computer server, includes logic for receiving at the server a request message from the client device, wherein the request message comprises a nonce, a nonce count and an encrypted request, logic for determining whether the client device has permission to access the server using the nonce and the nonce count, logic for forming an encrypted server response message in response to the encrypted request and the client device has permission to access the server, and logic for issuing the encrypted server response message from the server to the client device.

In another embodiment, a method for conducting secured communications between a server and a client device in a network includes receiving at the server a request message from the client device, wherein the request message comprises a nonce, a nonce count and an encrypted request, determining whether the client device has permission to access the server using the nonce and the nonce count, forming an encrypted server response message in response to the encrypted request and the client device has permission to access the server, and issuing the encrypted server response message from the server to the client device.

DESCRIPTION OF EMBODIMENTS

The present invention enables secured communications between a server and a client device in a network. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Some examples described herein provide systems and methods for providing an aggregated backend (e.g., comprising one or more server computers) that supports a user account (e.g., such as a Yahoo! email account or the like), where the aggregated backend includes data available on other backends of associated content nodes (e.g., other users accounts, exchanges, devices, etc.). For example, a user may have two or more email accounts, including various applications, such as email, contacts, calendar, and the like associated with each account. A first user account backend may mirror data of a second user account, such that data of the second account is accessible through the first user backend. The aggregated data is principally organized as a connected dataset having separate substructures, e.g., folder or other data file grouping system, provided by different content nodes. In one example, a connected dataset is established with an aggregated backend for each application type, whereby aggregation of two or more substructures, e.g., folder or other data file grouping system, provided by other content nodes also associated with or linked to the connected dataset, is done. In this manner a user may access data stored by two or more backends through one content node associated with the aggregated backend.

Figure 1A:
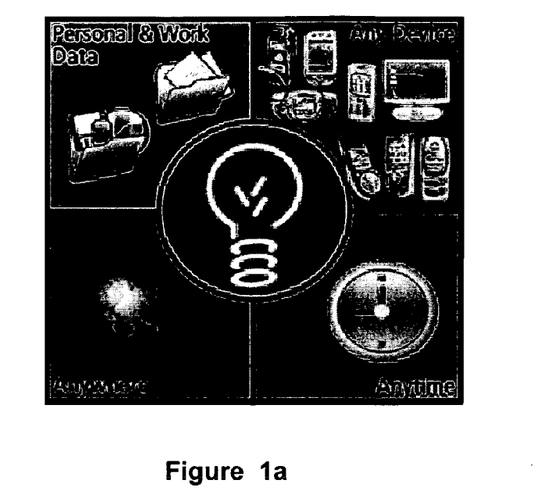
FIG. 1a illustrates a connected-data service according to an embodiment of the present invention.
Figure 1B:
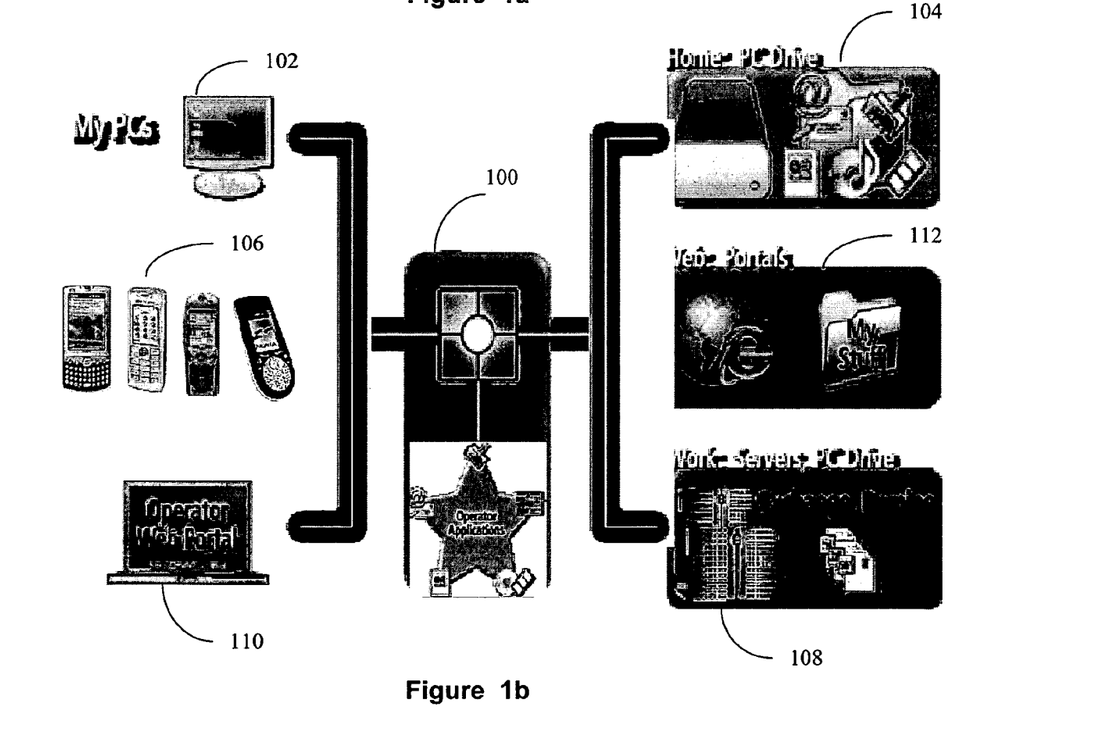
FIG. 1b illustrates a content router server in support of the connected-data service of FIG. 1a according to an embodiment of the present invention.

FIG. 1a illustrates a connected-data service according to an embodiment of the present invention. The connected-data service enables users to share and access their connected dataset with any device at any time from anywhere. User devices (also referred to as device or client) may include cellular phones, wireless personal digital assistants, navigation devices, personal computers, game consoles, Internet terminals, and kiosks. FIG. 1b illustrates a content router server in support of the connected-data service of FIG. 1a according to an embodiment of the present invention. The content router server 100 may be implemented by one or more computers/servers in different geographical locations. The content router server manages the connected dataset among the different computing devices a user may create or store data, including personal computers 102 and 104, mobile devices 106, servers 108, and web portals 110 and 112.

Figure 2:
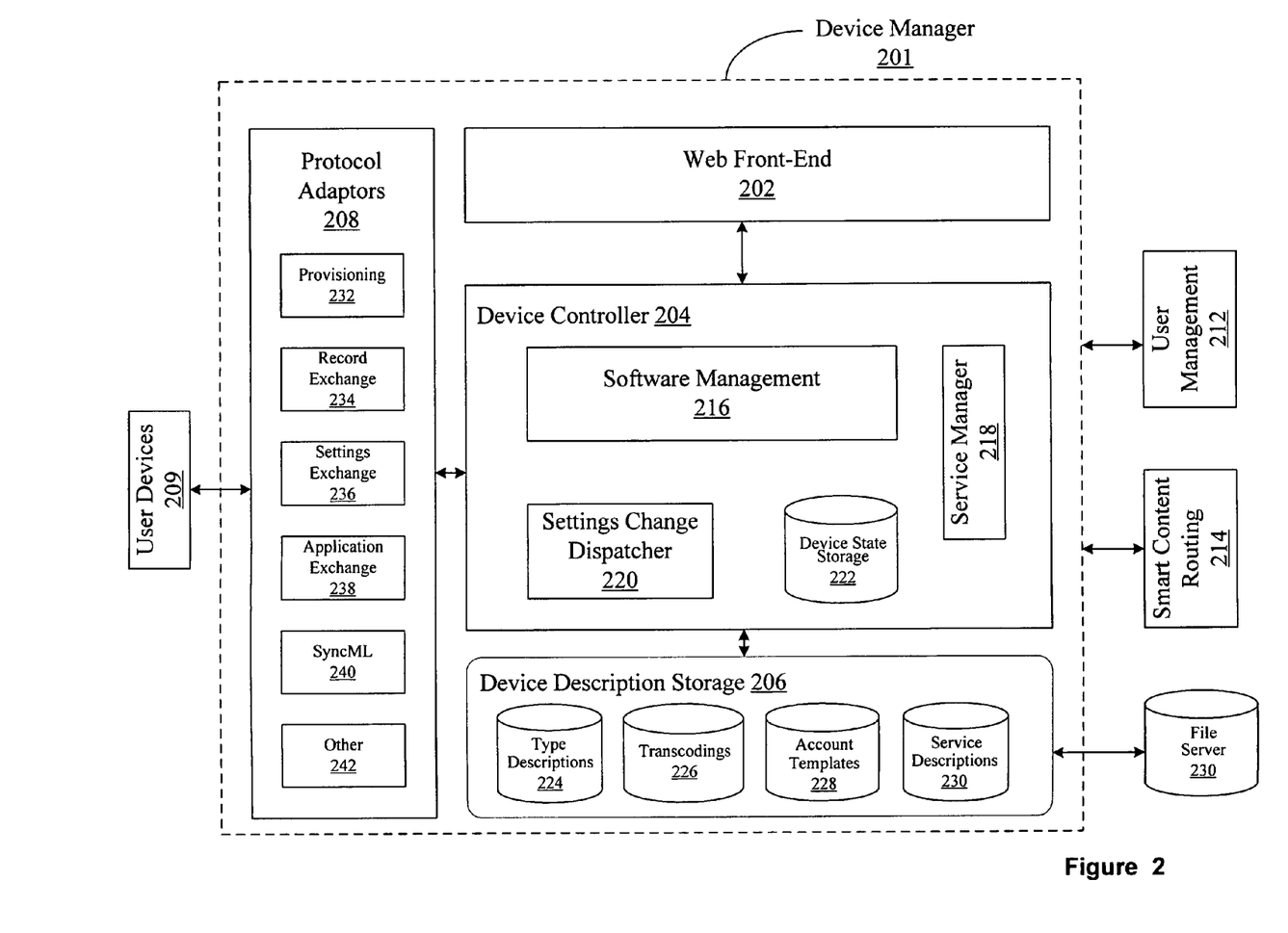
FIG. 2 illustrates an implementation of a device manager for managing communications between a content router server and a client device according to embodiments of the present invention.

FIG. 2 illustrates an implementation of a device manager for managing communications between a content router server and a client device according to embodiments of the present invention. The device manager 200 includes a web front-end 202, a device controller 204, a device description storage 206, and a set of protocol adapters 208. The device manager communicates and manages the user devices 210 through the protocol adapters 208. In addition, the device manager communicates with other portions of the content router server through a user management unit 212 and a smart content routing unit 214. Note that the user management unit is used to manage user devices from different services. This unit is optional if all users are from the same Internet service provider, such as the SBC-Yahoo DSL service.

The device controller 204 further includes a software management unit 216, a service manager 218, a settings change dispatcher 220, and a device state storage 222. The software management unit 216 installs, updates, and de-installs records, settings, and applications for the user devices. The service manager 218 manages the types of services supported for the user devices. The service manager provides information to the smart content routing unit 214 for transferring the connected-date-set among the user devices and the content router server. The setting change dispatcher 220 provides changes in device settings from the device manager to the user devices. The device state storage 222 stores the information about the operating states of the user devices.

The device description storage 206 stores type descriptions 224, transcodings 226, account templates 228, and service descriptions 230 of the user devices 210 supported by the connected-data service. The device manager transfers such device information between the device description storage 206 and a file server 230. The device manager associates user devices with different combinations of type descriptions, transcodings, account templates, and service descriptions such that each of the combination may be tested and verified for a predefined group of user devices. As a result, different service lines contain corresponding device characteristics and services may be provided to different groups of users.

The protocol adapters 208 may include a provisioning unit 232, a record exchange unit 234, a setting exchange unit 236, an application exchange unit 238, a SyncML unit 240, and other adaptor units 242. Note that the functional units described above (i.e. logical blocks 200-244) may be implemented in software, hardware, firmware or a combination thereof. The device manager is further described in patent application Ser. No. 11/182,348, entitled "System and Method for Servicing a User Device," which is incorporated herein by reference in its entirety.

In general, the security protocol of the present invention provides confidentiality, integrity, authentication, and compression for the communication between a content router server and the client devices of the connected-data service. The solution is efficient and scalable while maintaining a high level of security. During provisioning, each client device is provided with a device secret, which is a cryptographically strong key. The device secret is used to generate session keys to encrypt the communication with 128 bit AES encryption.

The security layer is implemented between Hypertext Transfer Protocol (HTTP) and the Records Exchange (Rex) and Settings Exchange (SetEx) Protocols. The Extensible Markup Language (XML) document payload is compressed and encrypted and transported as HTTP message body. The compression, encryption and authentication are handled by the Security Servlet. After the message payload is decrypted and decompressed, the Security Servlet passes the clear text payload to the device proxy along with the verified device identity. The REx and other protocols use the verified device identity (ID) and ignore the device ID inside the payload.

Figure 3:
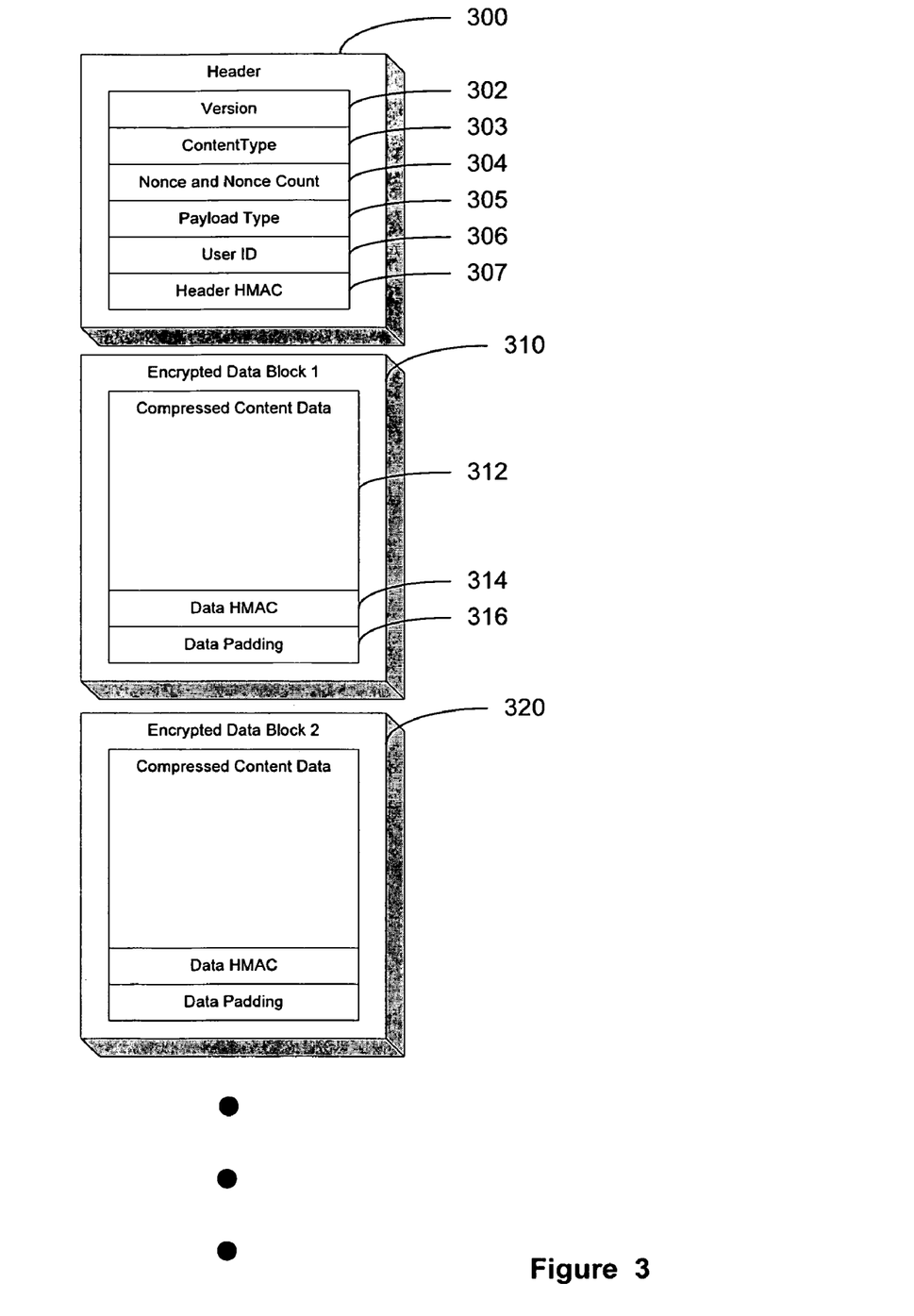
FIG. 3 illustrates an example message format of the security protocol according to an embodiment of the present invention.

FIG. 3 illustrates an example message format of the security protocol according to an embodiment of the present invention. The security packet includes a header block 300 and one or more data blocks 310, 320 and etc. The header block 300 includes the version 302, content type 303, nonce and nonce count 304, payload type 305, user ID 306, and header message authentication code (HMAC) 307 (cipher suite and security parameters) of the client device. Each data block includes a compressed content data 312, a data HMAC 314, and a data padding 316. Note that large payload may be divided into multiple data blocks (310, 320, etc), and each data block may be individually compressed and encrypted so that the device does not need to allocate a large buffer for the encryption and compression. The byte order for multi-byte values is network-order or big-endian format.

The following example shows a data structure of the header block according to an embodiment of the present invention.

```
struct {
    byte major;
    byte minor;
} Version
enum {
    request_header    (0),
    response_header   (1)
} ContentType
enum {
    NONE                   (0),
    AES_128_CBC_WITH_MD5   (1)
} CipherSuite
enum {
    NONE              (0),
    XML_COMPRRESSION  (1)
} CompressionMethod
enum {
    OK                      (0),
    not_supported_version   (1),
    insufficient_security   (2),
    invalid_device          (3),
    decryption_failed       (4),
    bad_mac                 (5),
    decompression_failed    (6),
    security_error          (7),
    invalid_nonce           (8),
    invalid_nonce_count     (9)} Status
struct {
    byte   length;
    byte   data<1 . . . 256>;
} Opaque
Enum {
    Security        (0)
    Provision       (1),
    Protocol Data   (2)        // REx, SetEx, Briefcase, getbinary
} PayloadType
struct {
    Version             version;
    ContentType         contentType;
    CipherSuite         cipherSuite;
    CompressionMethod   compressionMethod;
    Byte                nonce[16];
    Byte                nonceCount[4];
    Byte                payloadType;
    Opaque              payloadVersion;
    Opaque              domain;
    Opaque              extUserID;
    Opaque              extraData;
    Byte                headerMAC[16];
} RequestHeaderBlock
struct {
    Version             version;
    ContentType         contentType;
    CipherSuite         cipherSuite;
    CompressionMethod   compressionMethod;
    Byte                nonce[16];
    Byte                nonceCount[4];
    Byte                payloadType;
    Opaque              payloadVersion;
    Status              status;
    Byte                headerMAC[16];
} ResponseHeaderBlock
```

Table 1 illustrates a sample request header block according to an embodiment of the present invention.

TABLE 1

| Byte | Value | Description |
| --- | --- | --- |
| 0 | 0x01 | Version 1.0 |
| 1 | 0x00 | |

TABLE 1-continued

| Byte | Value | Description |
| --- | --- | --- |
| 2 | 0x00 | Request Header Block |
| 4 | 0x01 | AES_128_CBC_WITH_SHA |
| 5 | 0x01 | XML_COMPRRESSION |
| 6-17 | . . . | Nonce |
| 18-21 | . . . | Nonce count |
| 22 | 0x01 | Payload type "REx" |
| 23 | 0x03 | Payload version |
| 24-26 | "1.0" | Payload version |
| 27 | 0x02 | Length 4 |
| 28-29 | "vs" | Domain "vs" |
| 30 | 0x04 | Length 16 |
| 31-34 | "1001" | Extern User ID "1001" |
| 34-49 | | MAC |

Table 2 illustrates a sample response header block according to an embodiment of the present invention.

TABLE 2

| Byte | Value | Description |
| --- | --- | --- |
| 0 | 0x01 | Version 1.0 |
| 1 | 0x00 | |
| 2 | 0x01 | Response Header Block |
| 4 | 0x01 | AES_128_CBC_WITH_SHA |
| 5 | 0x01 | XML_COMPRRESSION |
| 6-17 | . . . | Nonce |
| 18-21 | . . . | Nonce count |
| 22 | 0x01 | Payload type "REx" |
| 23 | 0x03 | Payload version |
| 24-26 | "1.0" | Payload version |
| 27 | 0x00 | Status |
| 28-43 | | MAC |

The following example illustrates a data structure of a data block according to an embodiment of the present invention.

```
struct {
    Byte                length[4];
    Byte                encryptedContent[0 . . . 2^32];
} EncryptedDataBlock;
struct {
    Byte                blockSeqNum;
    CompressedContent   compressedContent;
    Byte                MAC[CipherSpec.hash_size];
    Byte                padding[paddingLength];
    Byte                paddingLength;
} toBeEncryptedContent;
struct {
    Byte                data[0 . . . 2^32];
} CompressedContent;
```

Figure 4:
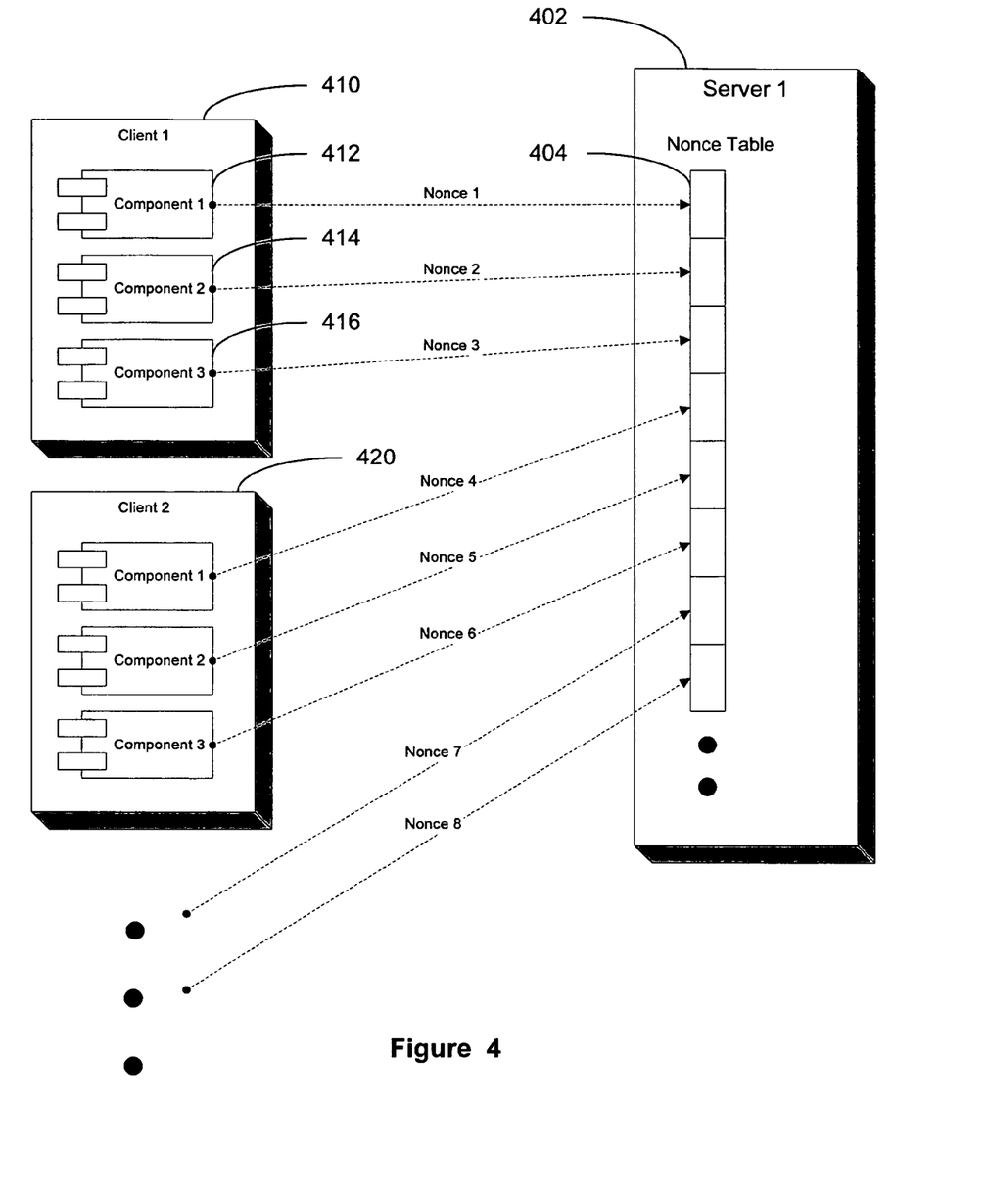
FIG. 4 illustrates a method for managing one or more nonce for multiple components of client devices according to an embodiment of the present invention.

FIG. 4 illustrates a method for managing one or more nonce for multiple components of client devices according to an embodiment of the present invention. In security engineering, a nonce is a number that has been used once. It is often a random or pseudo-random number issued in an authentication protocol to ensure that old communications cannot be reused in "replay attacks". For instance, nonces are used in HTTP digest access authentication to calculate an MD5 digest of the password. The nonces are different each time the authentication challenge response code is presented, thus making a replay attack virtually impossible. As shown in FIG. 4, each server 402 maintains a nonce table 404. Through a sticky load balancer, a client is assigned to the same server. In this way, the nonce table 404 can be maintained in a local memory, such as the random access dynamic memory of the server 402, without system wide sharing. Multiple components on the same client, for example components 1-3 (412, 414, and 416) can get different nonce from the same server. For example, nonce 1, nonce 2, and nonce 3 are created for component 1, component 2, and component 3 of client 1, respectively. Similarly, nonce 4, nonce 5, and nonce 6 are created for component 1, component 2, and component 3 of client 2, respectively. Each nonce count can be incremented independently. As a result, client applications do not need to manage nonce sharing among different components. This mechanism allows more efficient and simpler client implementation.

Figure 5:
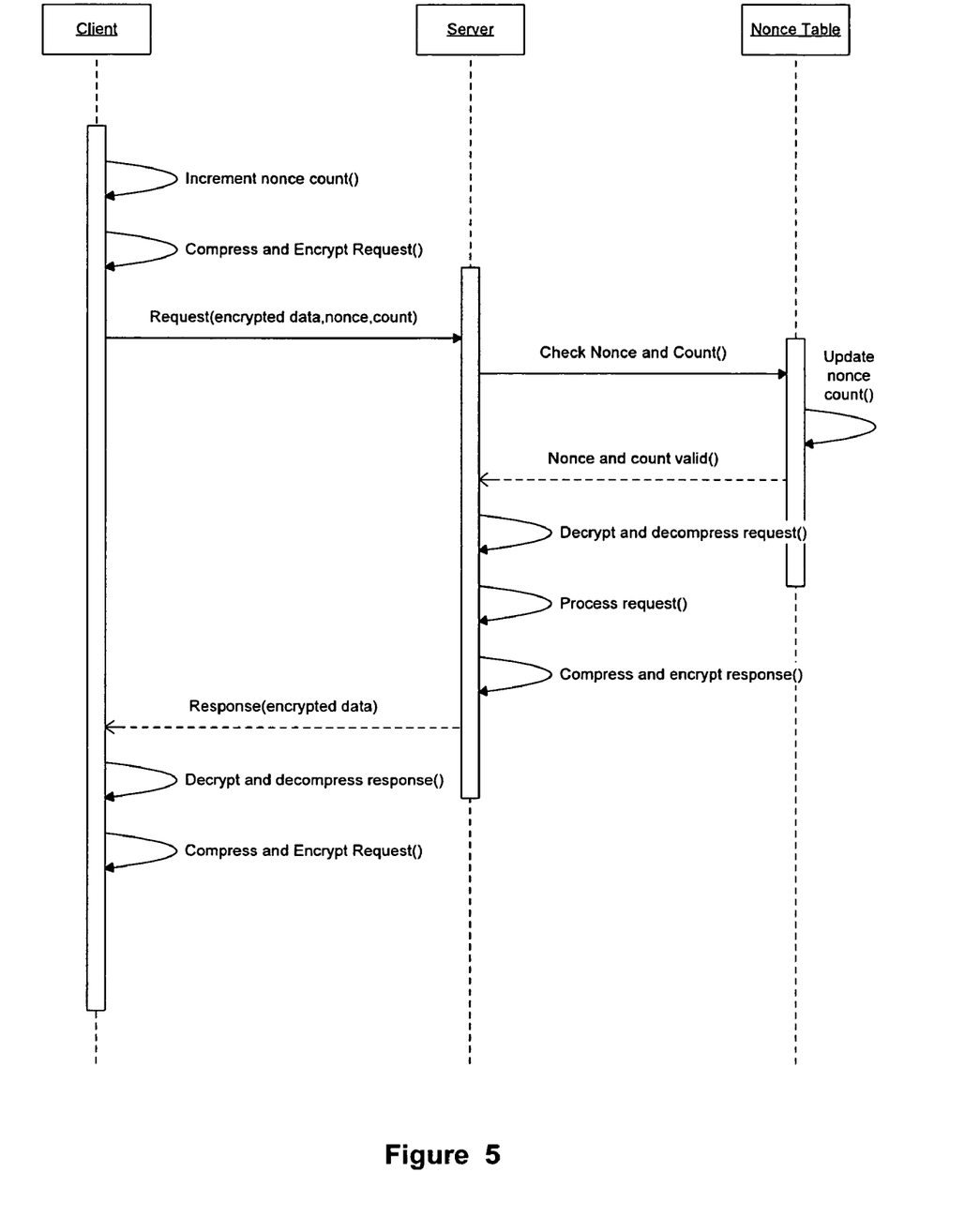
FIG. 5 illustrates a method for conducting secured communications between a server and a client device according to an embodiment of the present invention.

FIG. 5 illustrates a method for conducting secured communications between a server and a client device according to an embodiment of the present invention. In one approach, the following describes the steps for the device to send a request to the server.

1. increment the nonce count and generate the session keys;
2. construct the header block with the current security parameters;
3. divide the payload into smaller chunks if necessary;
4. compress each payload block with an XML Compression method;
5. convert the compressed content to a binary block. An MAC is calculated from the compressed content and concatenated to the compressed content;
6. concatenate padding and padding length to the data block according to the encryption algorithm;
7. encrypt the padded content;
8. encode the encrypted block; and
9. send the header block and the data blocks as the HTTP message body.

Upon receiving the request from the client device, the following describes the steps for the server performs to process the request.

1. receive the header block and parse the header;
2. check the protocol version, cipher suite, and compression method;
3. check the nonce and nonce count. The nonce is verified to be valid and the nonce count has not been repeated. Otherwise, send back a nonce error with a new nonce;
4. retrieve the device secret based on the domain and extern user ID;
5. generate the session keys and process each data block;
6. decrypt the data block;
7. verify the MAC;
8. decompress the data block;
9. assemble the processed data blocks into XML document;
10. Pass the payload XML document, domain, and extern user ID to the device proxy; and
11. hold the connection and wait for the response from the device proxy.

Note that the interface between the Security Servlet and the device proxy can be another HTTP or a remote session method call. The Security Servlet request/response processing is synchronous. After the server decrypts the request payload and sends the payload to the device proxy, it keeps open both the connection to the device and the connection to the device proxy. When the response payload comes back from the device proxy, the same security parameters are used to compress and encrypt the payload before the encrypted payload is sent back to the device. In addition, if the status code indicates an expired nonce, the same request is resent with the new nonce. In that case, the payload is decrypted and decompressed with the same session keys.

The following example shows the data structure of the state of the security parameters according to an embodiment of the present invention.

```
struct {
    CipherAlgorithm    cipherAlgorithm;
    Uint8              keySize;
    Uint8              blockSize;
    Uint8              ivSize;
    MACAlgorithm       macAlgorithm
    Uint8              macSize;
    CompressionMethod  compressionMethod;
    Opaque             deviceSecret;
    Byte               serverNonce[16];
    Byte               nonceCount[4];
} SecurityParameters;
Session keys can be generated from the security parameters.
    Byte               encryptionKey[keySize];
    Byte               encryptionIV[ivSize];
    Byte               macKey[keySize];
```

A device possesses a shared device secret before initiating the secure connection to the server. The shared secret is a UTF-8 encoded string. It is hashed using the MD5 Cipher Suite for generating the session key. The following example shows a session key generation algorithm. It is similar to SSL session key generation, but it is simplified.

```
Secret = MD5( device_secret_string)
P_MD5(secret, seed) = HMAC_MD5(secret, A(1) + seed) +
                      HMAC_MD5(secret, A(2) + seed) +
                      HMAC_MD5(secret, A(3) + seed)
    Where
        A(0) = seed
        A(i) = HMAC_MD5(secret, A(i-1))
Key_material = P_MD5(device_secret, "Session Key" +
nonce + nonce_count)
Mac_key = key_material[0 . . . 15];
Encryption key = key_material[16 . . . 31];
IV = key_material[32..47];
```

The following example shows a Cipher Suite according to an embodiment of the present invention.

```
encryption algorithm:    128 bit AES, CBC mode
mac algorithm:    HMAC_MD5
key size: 128 bit (16 byte)
block size:    128 bit
iv size:       128 bit
mac size:      128 bit
MAC: 16 byte HMAC_MD5 of the compressed content
```

The SSL padding scheme is used for the encryption padding. For example, the compressed data block is 1000 bytes. The MAC size 16 and the padding length byte is added to the length (1000+16+1=1017). In this case, 7 more bytes are needed to make the length of the data block to be an integral multiple of the block size of 16. Therefore, the padding and padding length of 0x07 0x07 0x07 0x07 0x07 0x07 0x07 0x07 are added before the encryption.

The security encryption header includes a payload type field 305. When it is set to value 0, the encrypted payload is a security payload. The security payload is processed by the security layer and the payload is not forwarded to the device proxy protocol handlers.

The security response header includes a status field that is transferred. This status only contains status codes for encryption and authentication failures that render the encrypted payload unreadable. All the other security events are presented in the encrypted security payload so that no unnecessary information is revealed.

Figure 6:
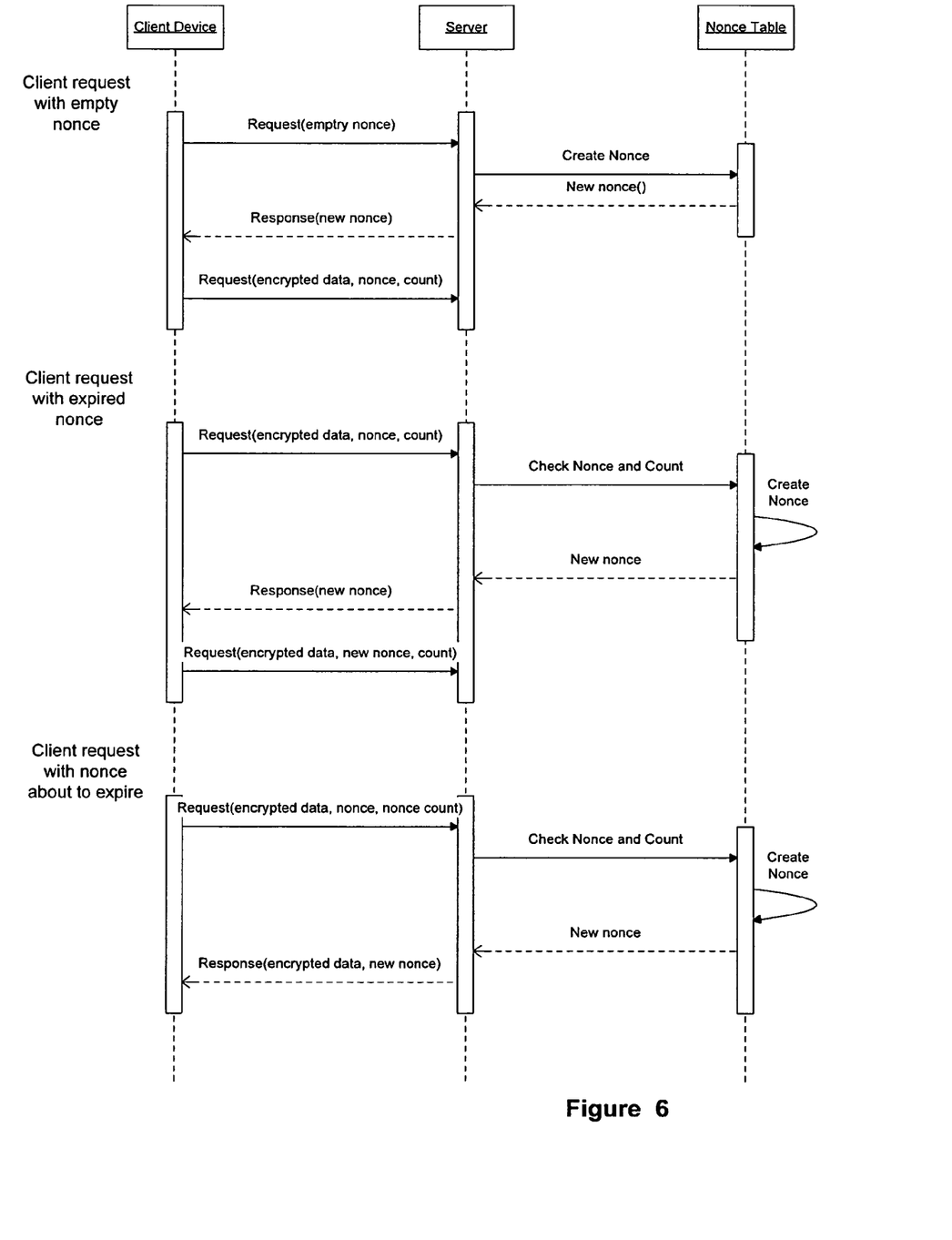
FIG. 6 illustrates special conditions for handling client requests according to an embodiment of the present invention.

FIG. 6 illustrates special conditions for handling client requests according to an embodiment of the present invention. The first scenario is when the device does not have server nonce prior to the first request to the server. A fresh nonce is to be obtained from the server by sending a request with an empty nonce (only the request header block that does not contain un-encrypted request data block). The server checks the protocol version, the cipher suite, and the compression method. If the server determines that the client is supported by the server and the security level is sufficient, then, the server creates a new nonce and the new nonce is sent back to the device in a response. The status of the response is set to "invalid_nonce" to indicate a new nonce is included.

Note that each nonce has a predetermined lifetime, for example 24 hours. The length of the lifetime is decided by the server. The second scenario is when the client makes a request with an expired nonce. The server sends back a response with a new nonce and a status "invalid_nonce"; the device then resends a second request encrypted with the new nonce and the new nonce count. In another approach, one way to reduce the extra request response due to nonce expiration is that the server predicates the nonce expiration. The third scenario is when the client makes a request with a nonce that is about to expire, the server detects this condition and sends a new nonce in the next response before the nonce actually expires.

A device may be disabled in a number of ways as described below.
1. By Admin: an administrator may disable the device due to the user's failure of fulfilling payment obligation or some other events. The disabling duration is normally indefinite until the administrator re-enables the device.
2. By User: the device may be disabled temporarily when the user goes on vacation. The user may specify an "until" time when the device will be automatically re-enabled.
3. Due to Error: an irrecoverable error may render the device in a disabled state.

When a device is disabled and the device attempts to connect to the server, a security error is returned to the device with a security payload indicating the disabled status. In such situations, the client's request is not forwarded to device proxy protocol handlers.

If the device in a disabled state connects to the server for the first time or after more than 24 hours, the device does not have a valid nonce to decrypt the security payload. In such situations, the server returns an invalid nonce error with a new nonce. The device resends the request with a valid nonce, and the server returns the security error with the device disabling payload.

The security payload is an XML document. The device disabling is an authorization failure. The following example shows a description of the XML elements.
Status: the defined status codes are
0—success
1—device disabled
Reason: the reason code for device disabling. The supported values are:
admin
user
error
appexSunset
deviceFull
readyForDelete
needsRepair
moved
Until: the "until" time when the device is re-enabled. It is in the UTC time format. This element is optional. If it is missing, the device is disabled indefinitely until someone re-enables it.
Description: the description of the security event from the server. This description is displayed to the user.

The following example shows an XML schema according to an embodiment of the present invention.

```
<?xml version="1.0" encoding="UTF-8"?>
<xs:schema xmlns:xs="http://www.w3.org/2001/XMLSchema"
elementFormDefault="qualified" attributeFormDefault="unqualified">
   <xs:element name="authorization">
      <xs:annotation>
         <xs:documentation>Comment describing your root
         element</xs:documentation>
      </xs:annotation>
      <xs:complexType>
         <xs:sequence>
            <xs:element name="status">
               <xs:simpleType>
                  <xs:restriction base="xs:integer">
                     <xs:enumeration value="0 - success"/>
                     <xs:enumeration value="1 - device disabled"/>
                     <xs:enumeration value=""/>
                  </xs:restriction>
               </xs:simpleType>
            </xs:element>
            <xs:element name="reason">
               <xs:simpleType>
                  <xs:restriction base="xs:string">
                     <xs:enumeration value="admin"/>
                     <xs:enumeration value="user"/>
                     <xs:enumeration value="error"/>
                     . . .
                  </xs:restriction>
               </xs:simpleType>
            </xs:element>
            <xs:element name="until" minOccurs="0">
               <xs:annotation>
                  <xs:documentation>UTC time</xs:documentation>
               </xs:annotation>
            </xs:element>
            <xs:element name="description" type="xs:string"/>
         </xs:sequence>
      </xs:complexType>
   </xs:element>
</xs:schema>
```

The server stops sending notifications to a device that is disabled. There is no separate device enabling notification. When the device is re-enabled, the server sends out the withheld notifications due to device disabling. The device listens for notification even when it is disabled. If the disabling configuration has an "until" time, the device tries to connect to the server after the "until" time. The connection may re-enable the device automatically. If the disabling configuration does not have an "until" time, the device waits for the notification. If the user triggers a manual synchronization, the device tries to synchronize manually. If the device is still disabled, it presents the disable description to the server.

As described in association with FIG. 3, the content data of the request message and the response message are compressed by the transmitting device and decompressed by the receiving device. The compression is performed by the transmitting device before the data block is encrypted for transmission, and the decompression is performed by the receiving device after the data block is decrypted. Both the server and the client use the same compression and decompression algorithms. Due to the specific formats of the request message and response message, the payload of the request message or the response message typically includes a fixed overhead, which can be efficiently compressed or decompressed by the transmitting device and the receiving device respectively. In one embodiment, the following compression grammar is used by both the server and the client device for performing compression and decompression according to an embodiment of the present invention.

```
CompressedStream = { XMLElement }
XMLElement = XML_Tag | XML_CDATA | XML_Text |
XML_DictionarySwitch |
SYMBOL_TAG_END
XML_Tag = XML_Symbol [{XML_AttributeName
XML_AttributeValue} ]
XML_Symbol = Symbol | SYMBOL_UNKNOWN_TAG_START
7Bit-Clean-Text
SYMBOL_UNKNOWN_TAG_END
XML_AttributeName = Symbol |
SYMBOL_UNKNOWN_ATTR_START UTF8-Text
SYMBOL_UNKNOWN_ATTR_END
XML_AttributeValue = Symbol |
SYMBOL_VALUE_START UTF8-Text SYMBOL_VALUE_END
XML_CDATA = SYMBOL_CDATA_START UTF8-Text
SYMBOL_CDATA_END
XML_Text = SYMBOL_TEXT_START UTF8-Text
SYMBOL_TEXT_END
XML_DictionarySwitch= SYMBOL_SWITCH_TO_BASE_DICT
            | SYMBOL_SWITCH_TO_CONTACT_DICT
            | SYMBOL_SWITCH_TO_NOTE_DICT
```

The method pre-builds a compression dictionary to be used by the server and the client device for compression and decompression of an XML document. An example of a compression dictionary is shown below.

```
        SYMBOL_TEXT_START = 1;
        SYMBOL_TEXT_END = 2;
        SYMBOL_VALUE_END = 3;
        SYMBOL_CDATA_END = 4;
        SYMBOL_TAG_END = 5;
        SYMBOL_UNKNOWN_TAG_END = 6;
        SYMBOL_UNKNOWN_ATTR_END = 7;
        SYMBOL_UNKNOWN_TAG_START = 8;
        SYMBOL_UNKNOWN_ATTR_START = 9;
        SYMBOL_CDATA_START = 10;
        SYMBOL_VALUE_START = 11;
        SYMBOL_REX_METHODRESPONSE = 100;
        SYMBOL_REX_PARAM = 101;
        SYMBOL_REX_PARAMS = 102;
        SYMBOL_REX_STRUCT = 103;
        SYMBOL_REX_MEMBER = 104;
        SYMBOL_REX_NAME = 105;
        SYMBOL_REX_VALUE = 106;
        SYMBOL_REX_RESULT = 107;
        SYMBOL_REX_INT = 108;
        SYMBOL_REX_DATATYPES = 109;
        SYMBOL_REX_DATATYPENAME = 110;
        SYMBOL_REX_CONTACTS = 111;
        SYMBOL_REX_SYNCANCHOR = 112;
        SYMBOL_REX_EXCHANGESTATUS = 113;
        SYMBOL_REX_ARRAY = 114;
        SYMBOL_REX_TODOS = 115;
        SYMBOL_REX_EVENTS = 116;
        SYMBOL_REX_MAIL = 117;
        SYMBOL_REX_ITEMS = 118;
        SYMBOL_REX_ITEMREF = 119;
        SYMBOL_REX_ITEMTYPE = 120;
        SYMBOL_REX_RECORDID = 121;
        SYMBOL_REX_METHODCALL = 128;
        SYMBOL_REX_METHODNAME = 129;
        SYMBOL_REX_ACKITEMS = 130;
        SYMBOL_REX_CREDENTIAL = 131;
```

-continued

```
        SYMBOL_REX_STRING = 132;
        SYMBOL_REX_USERID = 133;
        SYMBOL_REX_14 = 135;
        SYMBOL_REX_BOOLEAN = 136;
        SYMBOL_REX_GETITEMS = 137;
        SYMBOL_REX_DATA_TEXT = 138;
        SYMBOL_REX_DATA_XMLCOMAMND = 139;
        SYMBOL_REX_PUTITEMS = 140;
        SYMBOL_REX_SAVAILABLEDB = 141;
        SYMBOL_REX_BASE64 = 142;
```

The format of an XML document is shown as follows according to an embodiment of the present invention.

```
<?xml version="1.0" encoding="UTF-8"?>
<methodResponse>
    <params>
        <param>
            <value>
                <struct>
                    <member>
                        <name>result</name>
                        <value>
                            <int>200</int>
                        <value>
                    </member>
                    <member>
                        <name>dataTypes</name>
                        <value>
                            <array>
                                <data>
                                    <value>
                                        <struct>
                                            <member>
                                                <name>dataTypeName</name>
                                                <value>s-devTypeIdent</value>
                                            </member>
                                            <member>
                                                <name>exchangeStatus</name>
                                                <value>
                                                    <int>200</int>
                                                </value>
                                            </member>
                                        </struct>
                                    </value>
                                </data>
                            </array>
                        </value>
                    </member>
                </struct>
            </value>
        </param>
    </params>
</methodResponse>
```

Table 3 illustrates a translation of an XML document according to an embodiment of the present invention. The left column represents the formats of different fields of the XML document. The right column represents the numeric representation of the different fields of the XML document using the mapping of the compression dictionary.

TABLE 3

| | |
|---|---|
| <methodResponse> | 0x64 (SYMBOL_REX_METHODRESPONSE = 100 in dictionary) |
| <params> | 0x66 |
| <param> | 0x65 |
| <value> | 0x6A |
| <struct> | 0x67 |
| <member> | 0x68 |
| <name> | 0x69 |

TABLE 3-continued

| | |
|---|---|
| result | 0x6B |
| </name> | 0x05 |
| <value> | 0x6A |
| <int> | 0x6C |
| 200 | 0x01 0x32 0x30 0x30 0x02 |
| </int> | 0x05 |
| </value> | 0x05 |
| </member> | 0x05 |
| <member> | 0x68 |
| <name> | 0x69 |
| dataTypes | 0x6D |
| </name> | 0x05 |
| <value> | 0x6A |
| <array> | 0x72 |
| <data> | 0x8B |
| <value> | 0x6A |
| <struct> | 0x67 |
| <member> | 0x68 |
| <name> | 0x69 |
| dataTypeName | 0x6E |
| </name> | 0x05 |
| <value> | 0x6A |
| s-devTypeIdent | 0x01 0x73 0x2D 0x64 0x65 0x76 0x54 0x79 0x70 0x65 0x49 0x64 0x65 0x6E 0x74 0x02 |
| </value> | 0x5 |
| </member> | 0x5 |
| <member> | 0x68 |
| <name> | 0x69 |
| exchangeStatus | 0x71 |
| </name> | 0x05 |
| <value> | 0x6A |
| <int> | 0x6C |
| 200 | 0x01 0x32 0x30 0x30 0x02 |
| </int> | 0x05 |
| </value> | 0x05 |
| </member> | 0x05 |
| </struct> | 0x05 |
| </value> | 0x05 |
| </data> | 0x05 |
| </array> | 0x05 |
| </value> | 0x05 |
| </member> | 0x05 |
| </struct> | 0x05 |
| </value> | 0x05 |
| </param> | 0x05 |
| </params> | 0x05 |
| </params> | 0x05 |
| </methodResponse> | 0x05 |

As a result of applying the compression scheme, the XML document may be represented by the following sequence of numeric values.

64 66 65 6A 67 68 69 6B 05 6A 6C 01 32 30 30 02 05 05 05 68 69 6D 05 6A 72 8B 6A 67 68 69 6E 05 6A 01 73 2D 64 65 76 54 79 70 65 49 64 65 6E 74 02 05 05 68 69 71 05 6A 6C 01 32 30 30 02 05 05 05 05 05 05 05 05 05 05 05 05 05

When the device receives this compressed document, it follows the reverse process of decompression to construct the original XML document.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are to be seen as references to suitable means for providing the described functionality rather than indicative of a strict logical or physical structure or organization.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. An apparatus for conducting secured communications with a client device in a network, wherein the apparatus includes a processor, and a non-transitory computer readable storage medium having computer readable instructions for:
   receiving at the server a request message from the client device, wherein the request message comprises a nonce, a nonce count and an encrypted request, and wherein the request message is transported in a Hypertext Transfer Protocol (HTTP) message body;
   determining whether the client device has permission to access the server using the nonce and the nonce count;
   forming an encrypted server response message in response to the encrypted request and the client device having permission to access the server; and
   issuing the encrypted server response message from the server to the client device.

2. The apparatus of claim 1, wherein the request message comprises:
   a header block, wherein the header block includes version, content type, payload type, message authentication code, and user ID.

3. The apparatus of claim 1, wherein the request message further comprises:
   one or more encrypted data blocks, wherein each data block includes compressed content data, message authentication code, and padding data.

4. The apparatus of claim 1, wherein determining whether the client device has permission to access the server using the nonce and the nonce count comprises:
   verifying that the nonce and nonce count exist in a nonce table, wherein the nonce table stores a list of nonces associated with a corresponding list of client requests.

5. The apparatus of claim 1, wherein forming an encrypted server response message comprises:
   decrypting the encrypted request to form a decrypted request according to a predetermined decryption scheme;

decompressing the decrypted request to form a decompressed request according to a predetermined decompression scheme; and preparing a server response message according to the decompressed request.

6. The apparatus of claim 5, wherein forming an encrypted server response message further comprises:

compressing the server response message to form a compressed server response message according to a predetermined compression scheme; and encrypting the compressed server response message to form the encrypted server response message according to a predetermined encryption scheme.

7. The apparatus of claim 6, wherein compressing comprises:

representing predefined portions of a message format by corresponding numeric values;

storing mappings of the predefined portions of the message format and the corresponding numeric values in a compression dictionary; and encoding a uncompressed message with numeric values using the mappings of the compression dictionary.

8. The apparatus of claim 5, wherein decompressing comprises:

representing predefined portions of a message format by corresponding numeric values;

storing mappings of the predefined portions of the message format and the corresponding numeric values in a compression dictionary; and decoding numeric values of a compressed message using the mappings of the compression dictionary.

9. The apparatus of claim 1 further comprising computer readable instructions for:

forming a new nonce in response to the nonce and the nonce count having empty values;

storing the new nonce in a nonce table;

issuing a response to the client device, wherein the response includes the new nonce; and receiving from the client device a second request message, wherein the second request message comprises the new nonce, a corresponding new nonce count, and a second encrypted request.

10. The apparatus of claim 1 further comprising computer readable instructions for:

forming a new nonce in response to the nonce and the nonce count having expired;

storing the new nonce in a nonce table;

issuing a response to the client device, wherein the response includes the new nonce; and receiving from the client device a second request message, wherein the second request message comprises the new nonce, a corresponding new nonce count, and a second encrypted request.

11. The apparatus of claim 1 further comprising computer readable instructions for:

forming a new nonce prior to expiration of the nonce and the nonce count;

storing the new nonce in a nonce table; and issuing a response to the client device, wherein the response includes the new nonce and an encrypted response message.

12. The apparatus of claim 1, wherein the client device comprises:

one or more components, wherein each component includes a communication thread that uses a unique nonce to communicate with the server, and wherein the corresponding nonce count of each unique nonce is incremented independent of the other nonce counts.

13. A method for conducting secured communications between a server and a client device in a network, comprising:

receiving at the server a request message from the client device, wherein the request message comprises a nonce, a nonce count and an encrypted request, and wherein the request message is transported in a Hypertext Transfer Protocol (HTTP) message body;

determining whether the client device has permission to access the server using the nonce and the nonce count;

forming an encrypted server response message in response to the encrypted request and the client device having permission to access the server; and issuing the encrypted server response message from the server to the client device.

14. The method of claim 13, wherein the request message comprises:

a header block, wherein the header block includes version, content type, payload type, message authentication code, and user ID.

15. The method of claim 13, wherein the request message further comprises:

one or more encrypted data blocks, wherein each data block includes compressed content data, message authentication code, and padding data.

16. The method of claim 13, wherein determining comprises:

verifying that the nonce and nonce count exist in a nonce table, wherein the nonce table stores a list of nonces associated with a corresponding list of client requests.

17. The method of claim 13, wherein forming an encrypted server response message comprises:

decrypting the encrypted request to form a decrypted request according to a predetermined decryption scheme;

decompressing the decrypted request to form a decompressed request according to a predetermined decompression scheme; and preparing a server response message according to the decompressed request.

18. The method of claim 17, wherein forming an encrypted server response message further comprises:

compressing the server response message to form a compressed server response message according to a predetermined compression scheme; and encrypting the compressed server response message to form the encrypted server response message according to a predetermined encryption scheme.

19. The method of claim 18, wherein compressing comprises:

representing predefined portions of a message format by corresponding numeric values;

storing mappings of the predefined portions of the message format and the corresponding numeric values in a compression dictionary; and encoding a uncompressed message with numeric values using the mappings of the compression dictionary.

20. The method of claim 17, wherein decompressing comprises:

representing predefined portions of a message format by corresponding numeric values;

storing mappings of the predefined portions of the message format and the corresponding numeric values in a compression dictionary; and decoding numeric values of a compressed message using the mappings of the compression dictionary.

21. The method of claim 13 further comprising:
forming a new nonce in response to the nonce and the nonce count have empty values;
storing the new nonce in a nonce table;
issuing a response to the client device, wherein the response includes the new nonce; and
receiving from the client device a second request message, wherein the second request message comprises the new nonce, a corresponding new nonce count, and a second encrypted request.

22. The method of claim 13 further comprising:
forming a new nonce in response to the nonce and the nonce count have expired;
storing the new nonce in a nonce table;
issuing a response to the client device, wherein the response includes the new nonce; and
receiving from the client device a second request message, wherein the second request message comprises the new nonce, a corresponding new nonce count, and a second encrypted request.

23. The method of claim 13 further comprising:
forming a new nonce in response to the nonce and the nonce count are about to expire;
storing the new nonce in a nonce table; and
issuing a response to the client device, wherein the response includes the new nonce and an encrypted response message.

24. The method of claim 13, wherein the client device comprises:
one or more components, wherein each component includes a communication thread that uses a unique nonce to communicate with the server, and wherein the corresponding nonce count of each unique nonce is incremented independent of the other nonce counts.

25. A non-transitory computer readable storage medium comprising computer readable instructions for conducting secured communications between a server and a client device in a network, the computer readable instructions for:
receiving at the server a request message from the client device, wherein the request message comprises a nonce, a nonce count and an encrypted request, and wherein the request message is transported in a Hypertext Transfer Protocol (HTTP) message body;
determining whether the client device has permission to access the server using the nonce and the nonce count;
forming an encrypted server response message in response to the encrypted request and the client device having permission to access the server; and
issuing the encrypted server response message from the server to the client device.

26. The non-transitory computer readable storage medium of claim 25, wherein the request message comprises:
a header block, wherein the header block includes version, content type, payload type, message authentication code, and user ID.

27. The non-transitory computer readable storage medium of claim 25, wherein the request message further comprises:
one or more encrypted data blocks, wherein each data block includes compressed content data, message authentication code, and padding data.

28. The non-transitory computer readable storage medium of claim 25, wherein determining whether the client device has permission to access the server using the nonce and the nonce count comprises:
verifying that the nonce and nonce count exist in a nonce table, wherein the nonce table stores a list of nonces associated with a corresponding list of client requests.

29. The non-transitory computer readable storage medium of claim 25, wherein forming an encrypted server response message comprises:
decrypting the encrypted request to form a decrypted request according to a predetermined decryption scheme;
decompressing the decrypted request to form a decompressed request according to a predetermined decompression scheme; and
preparing a server response message according to the decompressed request.

30. The non-transitory computer readable storage medium of claim 29, wherein forming an encrypted server response message further comprises:
compressing the server response message to form a compressed server response message according to a predetermined compression scheme; and
encrypting the compressed server response message to form the encrypted server response message according to a predetermined encryption scheme.

31. The non-transitory computer readable storage medium of claim 30, wherein compressing comprises:
representing predefined portions of a message format by corresponding numeric values;
storing mappings of the predefined portions of the message format and the corresponding numeric values in a compression dictionary; and
encoding a uncompressed message with numeric values using the mappings of the compression dictionary.

32. The non-transitory computer readable storage medium of claim 29, wherein decompressing comprises:
representing predefined portions of a message format by corresponding numeric values;
storing mappings of the predefined portions of the message format and the corresponding numeric values in a compression dictionary; and
decoding numeric values of a compressed message using the mappings of the compression dictionary.

33. The non-transitory computer readable storage medium of claim 25 further comprising computer readable instructions for:
forming a new nonce in response to the nonce and the nonce count have empty values;
storing the new nonce in a nonce table;
issuing a response to the client device, wherein the response includes the new nonce; and
receiving from the client device a second request message, wherein the second request message comprises the new nonce, a corresponding new nonce count, and a second encrypted request.

34. The non-transitory computer readable storage medium of claim 25 further comprising computer readable instructions for:
forming a new nonce in response to the nonce and the nonce count have expired;
storing the new nonce in a nonce table;
issuing a response to the client device, wherein the response includes the new nonce; and
receiving from the client device a second request message, wherein the second request message comprises the new nonce, a corresponding new nonce count, and a second encrypted request.

35. The non-transitory computer readable storage medium of claim 25 further comprising computer readable instructions for:
forming a new nonce in response to the nonce and the nonce count are about to expire;

storing the new nonce in a nonce table; and issuing a response to the client device, wherein the response includes the new nonce and an encrypted response message.

36. The non-transitory computer readable storage medium of claim 25, wherein the client device comprises: one or more components, wherein each component includes a communication thread that uses a unique nonce to communicate with the server, and wherein the corresponding nonce count of each unique nonce is incremented independent of the other nonce counts.

* * * * *